UNITED STATES PATENT OFFICE.

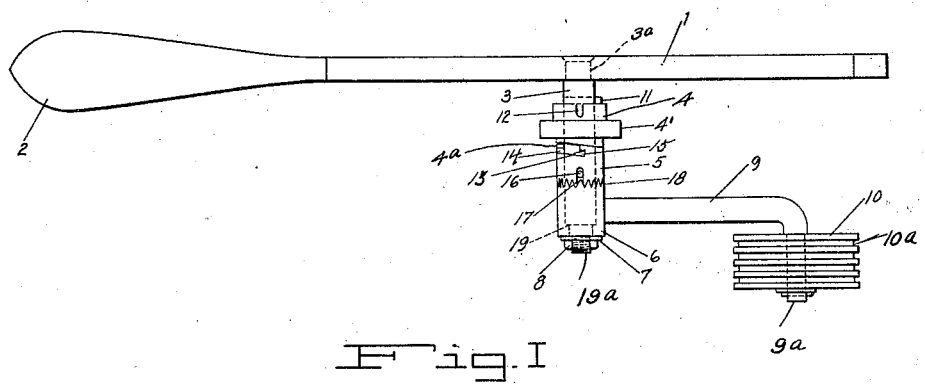
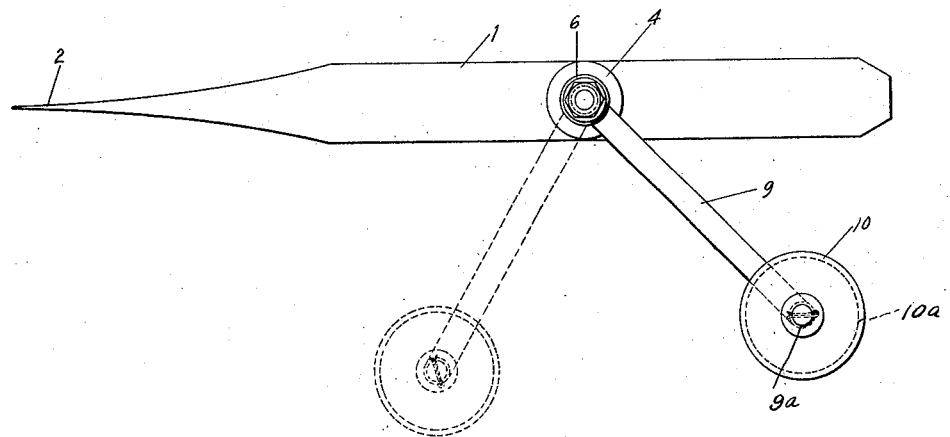
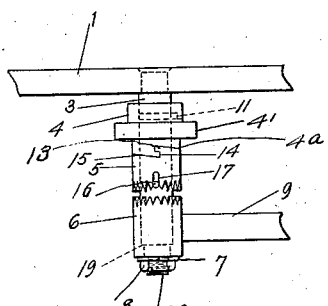

WILLIAM LE ROY BARTELL, DECEASED, LATE OF PORTLAND, OREGON, BY MRS. IDA COOK, ADMINISTRATRIX, OF WILLAMETTE, OREGON.

UNDERCUTTER.

1,420,234.      Specification of Letters Patent.    Patented June 20, 1922.

Application filed September 16, 1920, Serial No. 410,723. Renewed November 14, 1921. Serial No. 515,131.

*To all whom it may concern:*

Be it known that WILLIAM LE ROY BARTELL, deceased, late a citizen of the United States, and resident of Portland, in the county of Multnomah and State of Oregon, invented certain new and useful Improvements in Undercutters; and I, Mrs. IDA COOK, of Willamette, in the county of Clackamas and State of Oregon, administratrix for the estate of the said WILLIAM LE ROY BARTELL, deceased, do hereby declare the following is a full, clear, and exact description of the invention, such as will enable others skilled in the art to which it appertains, to make and use the same.

This invention relates to undercutters, and more particularly to a device of this character specially adapted for use in connection with logging operations.

One of the main objects of the invention is to provide an undercutter of simple and inexpensive construction which may be readily applied and adjusted to suit conditions and is well adapted to withstand the hard usage to which it is put.

A further object is to provide simple and efficient means whereby the supporting arms for the guide roller may be readily adjusted to suit circumstances.

Further objects will appear from the detailed description.

In the drawings:

Figure 1 is a top plan view of an undercutter constructed in accordance with my invention.

Figure 2 is a side view.

Figure 3 is a fragmentary top plan view showing the means for securing the supporting arm in adjustment in unlocked position.

The undercutter includes a driving dog 1 provided at its forward end with a forwardly tapering rounded blade 2, the rearward end of this dog being chamfered for driving purposes as illustrated. The blade 2 is well adapted to be driven into the tree or log to be sawed so as to effectually secure the device in place, the rounded outer portion of the blade permitting ready detachment of the device from the log when the sawing operation is completed. A stub shaft 3 is secured through dog 1 centrally of the body portion thereof, this stub shaft being provided with a squared portion $3^a$ fitting snugly through a corresponding opening in the body of the dog so as to effectually prevent rotation of the shaft.

The stub shaft 3 receives a collar 4 loosely mounted thereon and provided intermediate its ends with an annular flange $4'$ for convenience in adjusting this collar in a manner to be described. The forward or outer end portion of collar 4 is beveled or cut to give a cam surface $4^a$ which is adapted to cooperate with a similar surface provided at the inner end of a clutch member 5 slidable on sleeve 3 and provided with a longitudinally extending groove 17 in its outer end which receives a pin 16 secured to shaft 3, the clutch member 5 being thus locked against rotary movement relative to the shaft. Clutch member 5 cooperates with a similar clutch member 6 provided at the upper end of a supporting arm 9 carrying at its lower end an outwardly directed substantially right angularly disposed spindle $9^a$ upon which is rotatably mounted a grooved guide wheel 10, this wheel or roller being provided with spaced annular grooves $10^a$ which are adapted to receive the back of the saw blade for guiding the same during the sawing operation. The outer end portion of shaft 3 is reduced to form a shoulder 19 and a screw stud $19^a$ which extends through the outer end of clutch member 6, this stud receiving a washer 7 and a nut 8 by means of which clutch member 6 is held against movement longitudinally of shaft 3 while being free to turn about the same when disengaged from the clutch member 5.

Sleeve 4 is provided adjacent the inner end thereof with a longitudinally extending slot 12 which is adapted to receive a pin 11 secured to shaft 3 for holding the sleeve against rotation, this pin also providing a stop or bearing member for the inner end of sleeve 4 when the sleeve is turned so as to force the clutch member 5 into operative engagement with clutch member 6. In practice, when it is desired to adjust supporting arm 9, sleeve 4 is turned in a clockwise direction as considered in Figure 1, and lug 14 extending from the end of sleeve 4 engages into a corresponding recess 15 formed in the inner end of clutch member 5, a similar lug 13 carried by the clutch member fitting into a corresponding recess in the sleeve 4, the sleeve and the clutch member 5 being thus detachably secured together. When the sleeve and the clutch member are thus connected, slot 12 of the sleeve is brought into alinement with pin 11 so that the sleeve and clutch member 5 may be moved inwardly toward the dog 1 thus disengaging clutch member 5 from clutch member 6 so as to permit the latter member to be rocked about stub shaft 3 for adjusting the supporting arm 9 to suit conditions. When the desired adjustment has been effected, sleeve 4 is slid outwardly of shaft 3 so as to establish locking engagement between the clutch members, as at 18 in Figure 1, after which the sleeve 4 is turned in a counter-clockwise direction as indicated in Figure 1 about stub shaft 3 so as to secure the clutch members tightly in interlocking engagement, as illustrated.

By means of this device the saw supporting arm may be readily adjusted at any desired angle for supporting the saw for making an undercut, and the device may be quickly and easily applied. In practice it may be found desirable to resort to slight modifications in arrangement and construction of the details of my invention, and I intend to include all such variations, as fall within the scope of the appended claims, in this application in which a preferred form only of my invention is disclosed.

What I claim is:

1. An undercutter comprising a dog, a stub shaft carried by the dog, a clutch member rotatably mounted upon the stub shaft, an arm fixed to the clutch member, a guide wheel journaled upon the arm, a second clutch member having a cam surface and slidably mounted upon the stub shaft, and a sleeve rotatably mounted upon the stub shaft and having a cam surface cooperating with the cam surface of the second clutch member to engage and disengage the clutch members by the adjustment of said sleeve.

2. An undercutter comprising a dog, a stub shaft carried by the dog, a clutch member rotatably mounted upon the stub shaft, an arm fixed to the clutch member, a guide wheel journaled upon the arm, a second clutch member slidably mounted upon the stub shaft and having a cam surface, a pin carried by the stub shaft, and a sleeve rotatably mounted upon the stub shaft between the pin and cam surface of the second clutch member, said sleeve having a cam surface cooperating with the cam surface of the second clutch member and having a slot adapted to receive said pin in one position of the sleeve upon the stub shaft.

3. An undercutter comprising a dog, a stub shaft carried by the dog, a clutch member rotatably mounted upon the stub shaft, an arm fixed to the clutch member, a guide wheel journaled upon the arm, a second clutch member slidably mounted upon the stub shaft and provided with a cam surface and a lug, and a sleeve rotatably mounted upon the stub shaft and provided with a cam surface cooperating with the cam surface of the second clutch member and with a lug cooperating with the lug of the second clutch member.

4. An undercutter comprising a dog, a stub shaft carried by the dog, a clutch member rotatably mounted upon the stub shaft, an arm fixed to the clutch member, a guide wheel journaled upon the arm, a second clutch member slidably mounted upon the stub shaft and provided with a cam surface and a lug, a pin carried by the stub shaft, a sleeve rotatably mounted upon the stub shaft between the pin and the second clutch member and having a cam surface cooperating with the cam surface of the second clutch member and being provided with a slot adapted to receive the pin in one position of the sleeve, and a lug carried by the sleeve for cooperation with the lug on the second clutch member.

In testimony whereof I affix my signature in presence of two witnesses.

MRS. IDA COOK,
*Administratrix in the estate of William Le Roy Bartell, deceased.*
Witnesses:
R. E. LAWRENCE,
JOHN D. MANN.